F. ARMSTRONG.
GARTER.

No. 190,535. Patented May 8, 1877.

Witness,
John Tyler
Jno. J. Bonner

Inventor.
Frank Armstrong
By Attorney

UNITED STATES PATENT OFFICE.

FRANK ARMSTRONG, OF BRIDGEPORT, CONNECTICUT.

IMPROVEMENT IN GARTERS.

Specification forming part of Letters Patent No. 190,535, dated May 8, 1877; application filed April 6, 1877.

*To all whom it may concern:*

Be it known that I, FRANK ARMSTRONG, of Bridgeport, in the county of Fairfield and State of Connecticut, have invented certain new and useful Improvements in Metallic Bands and Garters; and I do hereby declare that the following is a full and exact description thereof, reference being had to the accompanying drawings, making a part of this specification.

My invention relates to certain improvements in metallic garters, bands, belts, &c. It has for its object the production of a garter, band, or belt composed of a series of alternate metallic tubes and rigid coils of wire, laced together by an elastic or non-elastic cord, and provided at either end with a novel hook or fastening device, as will be hereinafter more fully set forth.

Figure 1:
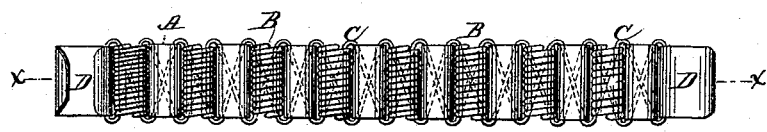
Figure 2:

In the drawing, Figure 1 represents a plan view of my improved garter, and Fig. 2 a section at the line $x\ x$ of Fig. 1.

Similar letters indicate like parts in both figures.

A A are short metal tubes, preferably of white metal; and B B, non-compressible tubes of equal length, composed of closely-coiled wire, preferably brass. These tubes and coils A and B are arranged alternately side by side, and laced together by a cord, elastic or non-elastic, though preferably elastic. C represents the lacing-cord, to which, at either end of the garter, are secured flat metal hooks D, the free hook ends of which face on opposite sides, so that the garter may be hooked right or left handed. These hooks D are so shaped that they will readily hook around either the strands of coiled wire or intermediate metal tubes, and by the reverse arrangement of the hooks, as hereinbefore stated, either side of the band may be turned out, the ends reversed, or, in fact, they may be put on without reference to sides or ends, and when one hook has been adjusted to retain the garter in position, the excess, if any, in the length of the garter is, by means of the other hook, hooked in place, to prevent dangling, and at the same time affording, as it were, double security against loss or unlocking. In case a non-elastic cord is used to lace together the tubes and coils, the garters should of course be made approximately in sizes, the flexibility of the flesh permitting the fastening, the slack end being secured, as described; and where an elastic cord is used, or the garter is composed of elastic coils entirely, or alternate elastic coils and non-elastic tubes, so much regard to sizes need not be had, as by the employment of my improved hook or fastening device the hook may be secured at any point between the two extremities of the garter and the free end fastened up.

I do not wish to limit myself, so far as my improved hook or fastening is concerned, to its employment in connection with garters such as I have illustrated in the accompanying drawing, as it may with equally as much advantage be employed in connection with garters such as I have shown in another application, filed simultaneously with the filing of this, or with any other composed of a series of vertically-arranged independent bodies strung together to form a garter.

What I claim as new, and desire to secure by Letters Patent, is—

1. A metallic garter, band, or belt, composed of alternate tubes of sheet metal and non-compressible coiled wire, laced together and provided with suitable hooking or securing devices at either end, substantially as described.

2. In combination with a series of short tubes of sheet metal or wire strung together to form a garter, a flat metal hook, secured as shown, whereby the hook end may be secured at any point between the ends of the band, substantially as hereinbefore set forth.

3. In combination with a series of tubes or coils arranged to form a garter or band, two flat metal hooks, one at either end, and arranged in reverse directions, substantially as and for the purposes set forth.

In witness whereof I have hereunto signed my name this 28th day of March, 1877.

FRANK ARMSTRONG.

Witnesses:
JNO. J. BONNER,
JOHN TYLER.